United States

Ito et al.

4,168,512

[45] Sep. 18, 1979

[54] OPTICAL SYSTEM FOR AN IMAGE PICKUP DEVICE

[75] Inventors: Yoshitoshi Ito, Ohme; Noriaki Honma, Kokubunji; Katsumi Takami, Tokyo; Shusaku Nagahara, Kokubunji; Akira Hashimoto, Ohme, all of Japan

[73] Assignee: Hitachi, Ltd., Japan

[21] Appl. No.: 819,051

[22] Filed: Jul. 26, 1977

[30] Foreign Application Priority Data

Jul. 26, 1976 [JP] Japan .................................. 51-88174

[51] Int. Cl.² .............................................. H04N 5/72
[52] U.S. Cl. ..................... 358/225; 350/206; 358/93
[58] Field of Search ................. 358/93, 100, 225, 101; 350/206

[56] References Cited

U.S. PATENT DOCUMENTS

| 2,762,259 | 9/1956 | Bouwers | 350/206 |
| 3,035,489 | 5/1962 | Simons | 350/206 |
| 3,278,752 | 10/1966 | Brixner | 358/225 |
| 3,476,457 | 11/1969 | Nomarski | 350/206 |
| 3,563,634 | 2/1971 | Parks | 350/206 |

*Primary Examiner*—Howard W. Britton
*Attorney, Agent, or Firm*—Craig and Antonelli

[57] ABSTRACT

In an optical system which is mounted on and used with an image pickup device for observing an object including a high brightness area therein, a pinhole is provided between the object and an imaging lens for separating the paths of the light rays from respective points of the object, and a filter which attenuates light from the high brightness area of the object which is separated by the pinhole.

10 Claims, 3 Drawing Figures

OPTICAL SYSTEM FOR AN IMAGE PICKUP DEVICE

BACKGROUND OF THE INVENTION

This invention relates to an optical system of the type which is mounted on an image pickup device, such as industrial TV (ITV) camera, for use in observing with the image pickup device a high brightness area, such as a portion being welded.

DESCRIPTION OF THE PRIOR ART

In general, when it is intended to observe a welding operation by the use of an image pickup device, baking or blooming arises in the photoelectric surface of the image pickup device because the brightness of the welding arc is very high. In consequence, it becomes impossible to observe the state of the weld.

In order to solve such a problem, the prior art has adopted a method in which a filter for light interception is attached to, for example, the imaging lens of the ITV camera. More particularly, light from an object to be observed in which a high brightness area exists passes through the imaging lens of the ITV camera, and it is imaged on the photoelectric surface of the image pickup tube by the imaging lens. Accordingly, the light intercepting filter for attenuating only the light from the high brightness area is disposed in front of the photoelectric surface, thereby intending to make the brightness of the image of the object uniform and to obtain a good ITV monitor picture.

However, when the proportions of separation of light rays from various parts of the object were inspected, it was revealed that the light rays from the various points are perfectly separated only on the imaging surface, i.e., on the photoelectric surface of the image pickup tube, that the proportions of separation become smaller as the position comes closer to the imaging lens from the photoelectric surface, and that the light rays are not separated on the surface of the lens at all. Most desirably, accordingly, the filter for partial interception ought to be disposed immediately before the photoelectric surface on which the light rays are perfectly separated. In actual practice, however, the filter cannot be provided on the photoelectric surface on account of the presence of the glass faceplate of the image pickup tube, etc. Therefore, it is usually disposed between the imaging lens and the photoelectric surface.

Unfortunately, the light rays from the various parts of the object are not perfectly separated in such interspace between the imaging lens and the photoelectric surface. Therefore, the filter for partial interception as disposed in order to attenuate the light from the high brightness area attenuates simultaneously part of the light from an area other than the high brightness area, i.e., an area being closely proximate to the high brightness area. With the prior art method, accordingly, even the brightness of the area surrounding the high brightness area is attenuated, so that the brightness of a picture becomes insufficient in those areas and the object cannot be definitely observed.

In the case where the imaging lens used is a zoom lens, the size of the image to be formed on the photoelectric surface is varied by the adjustment of the zoom lens, and in the interspace between the imaging lens and the photoelectric surface, the proportions of separation of the light rays from the various parts of the object vary accordingly. Therefore, the method described above becomes ineffective.

SUMMARY OF THE INVENTION

An object of this invention is to provide an optical system making it possible to definitely pick up the image of a scene in which a high brightness area exists.

In order to accomplish such object, according to this invention, optical means for separating light rays from an object to be observed is interposed between the object having the high brightness area and an imaging lens.

DESCRIPTION OF THE PREFERRED EMBODIMENT

Figure 1:
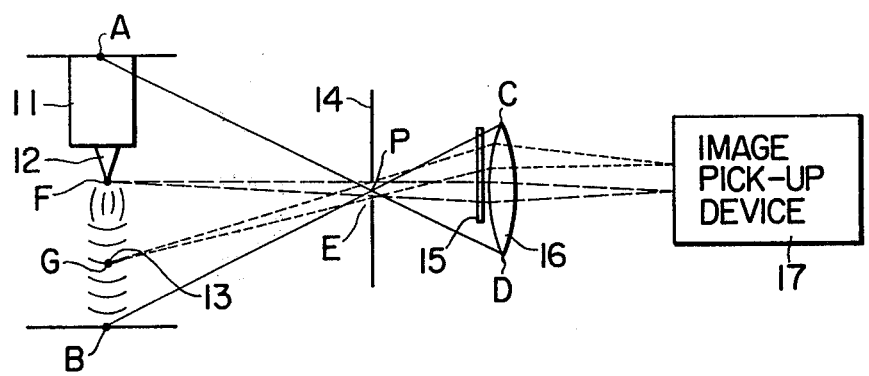
FIG. 1 is a schematic view showing the arrangement of an embodiment of this invention.

FIG. 1 is a view showing the arrangement of an embodiment of the optical system according to this invention.

Referring to the figure, letters A and B designate the upper limit and lower limit of the range of an object to be observed, respectively. Letters C and D designate the upper end and lower end of an imaging lens 16, respectively. Letter E indicates the point of intersection between a line joining the points A and D and a line joining the points B and C. Letter F indicates a high brightness area, which is surrounded by an area G. Numeral 11 represents a welding torch; numeral 12 identifies an electrode; and numeral 13 indicates a fused bead. Shown at 14 is optical means for separating light rays from the areas F and G, which is located at, for example, the intersection point E and which is, for example, a pinhole plate having a pinhole P.

Figure 2:
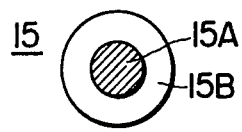
FIG. 2 is a schematic view showing the structure of a filter for use in this invention.

Further, numeral 15 denotes a filter which is disposed so as to attenuate the light from the high brightness area F. Numeral 17 denotes an image pickup device. Here, the filter 15 is one which has a portion for attenuating light. By way of example, as shown in FIG. 2, the central part 15A of the filter 15 exhibits a low light transmission factor, and the peripheral part 15B exhibits a high light transmission factor.

With such construction, the light rays from the high brightness area F and its surrounding area G pass through the pinhole provided in the pinhole plate 14, and they are imaged on a photoelectric surface of the image pickup device 17 by the imaging lens 16. The light rays from the areas F and G intersect at the position of the pinhole, i.e., the point E, and pass through quite the same place. Since, however, the traveling directions of the respective light beams are different after the passage through the pinhole, they are utterly separated on, for example, the surface of the imaging lens 16. The brightness of an image to be formed on the photoelectric surface of the image pickup device 17 can accordingly be made uniform in such a way that only the light from the high brightness area F is suitably attenuated by the part 15A of the filter 15 and that the light from the surrounding area G is permitted to permeate by the part 15B of the filter 15. Thus, an ITV monitor picture can be improved.

In this case, even a light beam from a part which is very close to the high brightness area can be perfectly separated by making the pinhole small. It is, accordingly, possible to effectively attenuate only the light beam of the high brightness area by means of the filter, and to definitely observe the surroundings of the high brightness area on the ITV monitor screen.

While the above description indicates that the filter 15 to be employed is one having a portion of low light transmission factor and a portion of high light transmission factor, it is a matter of course that the invention is not restricted thereto, but that a filter of high light transmission factor and a separate filter of low light transmission factor can be disposed for the respective light beams of different traveling directions.

It will be readily understood from FIG. 1 that the place of installation of the filter 15 for attenuating the light of the high brightness area may well be a part other than the front surface of the imaging lens 16; for example, the filter 15 may form a part of the rear surface of the imaging lens 16 (the side of the image pickup tube). That is, the filter 15 may be provided at any desired position between the object to be observed and the front surface of the image pickup tube 17. However, if the filter 15 is too close to the object for observation, it will sometimes be subject to bad influences by heat, etc. In order to avoid this drawback, and besides, since the light rays from the areas F and G are best separated in the vicinity of the imaging lens 16, it is the most effective to install the filter 15 near the imaging lens 16.

Figure 3:
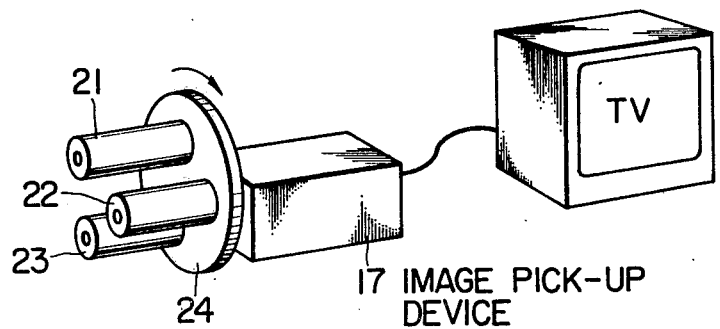
FIG. 3 is a schematic view for explaining a case where this invention is employed in practice.

FIG. 3 shows an example of apparatus which employs this invention in practice. Numerals 21, 22, and 23 designate body tubes each of which has an imaging lens made integral with a filter and a pinhole plate constructed as shown in FIG. 1. The imaging lenses of the respective body tubes have focal lengths different from one another and are mounted on a rotatable turret 24, so that any of the body tubes may be selected for an image pickup device 17. Such construction permits the enlargement or reduction of an image in a smaller size than in case of employing a zoom lens in the lens system. All the body tubes 21–23 need not always be provided with the pinhole plates and the filters. By providing only the imaging lens, at least one of the body tubes can be used for observation, for example, at the time when the high brightness area of the object to be observed has disappeared.

As set forth above, according to this invention, the situation in which a high brightness area exists within a field of view, especially the high brightness area and the vicinity thereof, can be definitely observed by display means such as an ITV monitor. Another advantage is that, since a filter for attenuating light from the high brightness area can be disposed in the vicinity of an imaging lens, the attachment of the filter is facilitated. In this manner, the invention is greatly effective in practical use.

While we have shown and described various embodiments in accordance with the present invention, it is understood that the same is not limited thereto but is susceptible of numerous changes and modifications as are known to a person skilled in the art, and we therefore do not wish to be limited to the details shown and described herein but intend to cover all such changes and modifications as are obvious to those of ordinary skill in the art.

What is claimed is:

1. In combination with an image pickup device which picks up the image of an object to be observed including a high brightness area therein, an optical system comprising:
   first optical means for imaging the object on said image pickup device;
   second optical means for separating the paths of the light rays from respective points of said object, said second optical means being disposed between said first optical means and said object; and
   third optical means for attenuating a predetermined one of the separated light rays, said third optical means being arranged in the path of the predetermined light rays.

2. The optical system for the image pickup device as defined in claim 1, wherein said third optical means is arranged in the vicinity of said first optical means within said path of said predetermined light rays.

3. The optical system for the image pickup device as defined in claim 1, wherein said second optical means is a pinhole plate having a pinhole.

4. The optical system for the image pickup device as defined in claim 1, wherein said third optical means is a filter having a portion of low light transmission factor.

5. The optical system for the image pickup device as defined in claim 1, wherein said first optical means is a lens.

6. The optical system for the image pickup device as defined in claim 5, wherein said second optical means is a pinhole plate having a pinhole.

7. The optical system for the image pickup device as defined in claim 6, wherein said third optical means is arranged in the vicinity of said first optical means within said path of said predetermined light rays.

8. The optical system for the image pickup device as defined in claim 7, wherein said third optical means is disposed between said pinhole plate and said lens.

9. The optical system for the image pickup device as defined in claim 8, wherein said third optical means is a filter having a portion of high light attenuation and a portion of relatively less light attenuation.

10. An optical system for the image pickup device as defined in claim 1 wherein the second optical means separates the path of the light rays from the high brightness area of the object from the paths of light rays from other areas of the object, and the third optical means attenuates these separated light rays from the high brightness area.

* * * * *